7 Sheets—Sheet 1.

F. HANSON.
Scalloping-Machine.

No. 221,303.   Patented Nov. 4, 1879.

WITNESSES:
Hubert J. Briggs
Chas. H. Kimball.

INVENTOR:
Freeman Hanson
By his atty
William Henry Clifford

7 Sheets—Sheet 2.

F. HANSON.
Scalloping-Machine.

No. 221,303. Patented Nov. 4, 1879.

WITNESSES:
Herbert G. Briggs
Chas. N. Kimball.

INVENTOR:
Freeman Hanson
By his att'y
William Henry Clifford

F. HANSON.
Scalloping-Machine.

No. 221,303.   Patented Nov. 4, 1879.

WITNESSES:
Herbert J. Briggs
Chas. H. Kimball.

INVENTOR:
Freeman Hanson
By his atty
William Henry Clifford

7 Sheets—Sheet 4

F. HANSON.
Scalloping-Machine.

No. 221,303. Patented Nov. 4, 1879.

WITNESSES:
Herbert G. Briggs
Chas H. Kimball.

INVENTOR:
Freeman Hanson
By his atty
William Henry Clifford

7 Sheets—Sheet 5.

F. HANSON.
Scalloping-Machine.

No. 221,303. Patented Nov. 4, 1879.

WITNESSES:
Herbert G. Briggs
Chas. H. Kimball.

INVENTOR:
Freeman Hanson
By his atty
William Henry Clifford

7 Sheets—Sheet 6.

F. HANSON.
Scalloping-Machine.

No. 221,303.  Patented Nov. 4, 1879.

WITNESSES:
Herbert G. Briggs
Chas. H. Kimball.

INVENTOR:
Freeman Hanson
By his atty
William Henry Clifford

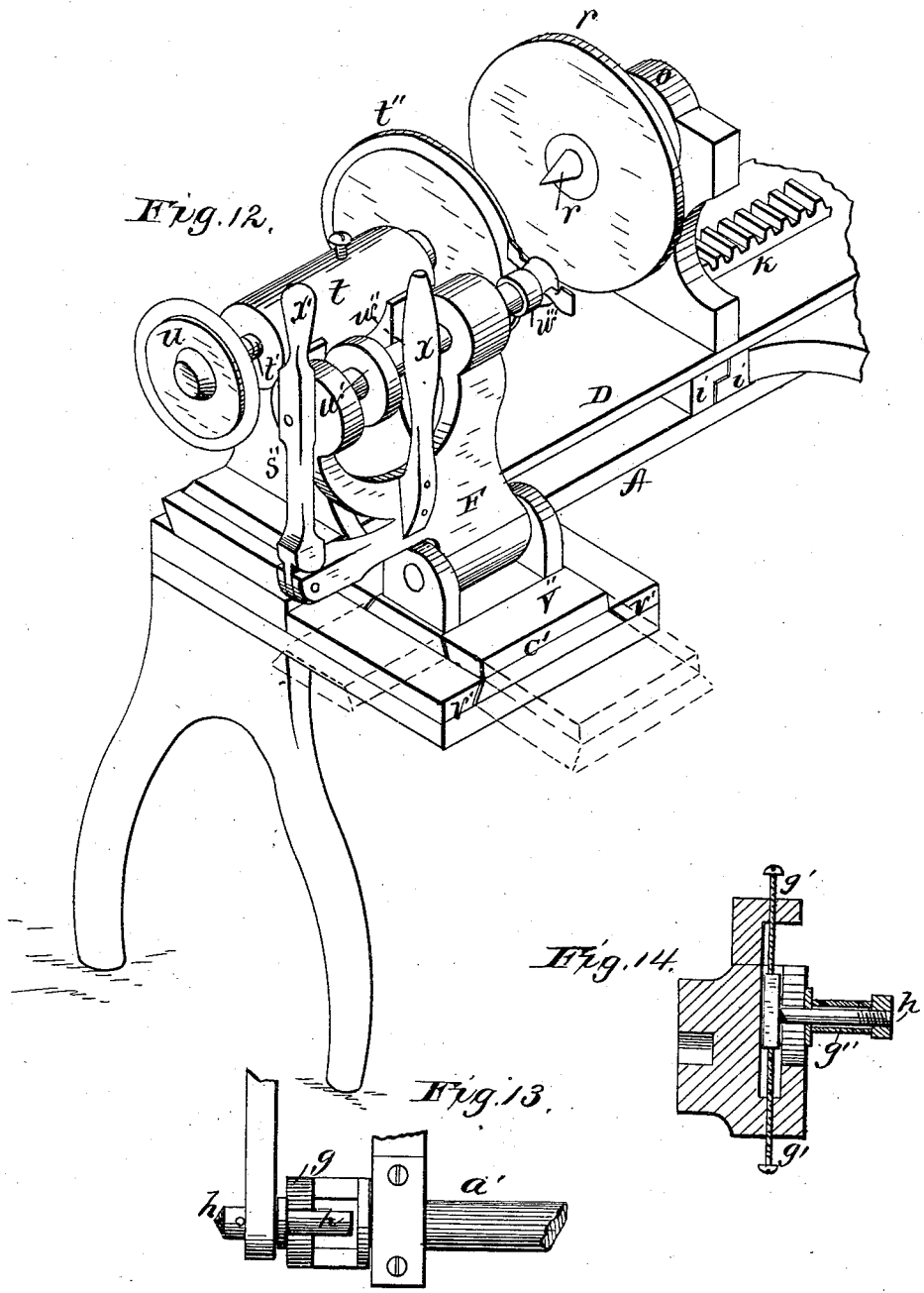

UNITED STATES PATENT OFFICE.

FREEMAN HANSON, OF HOLLIS, MAINE.

IMPROVEMENT IN SCALLOPING-MACHINES.

Specification forming part of Letters Patent No. 221,303, dated November 4, 1879; application filed July 12, 1879.

*To all whom it may concern:*

Be it known that I, FREEMAN HANSON, of Hollis, in the county of York and State of Maine, have invented certain new and useful Improvements in Scalloping-Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
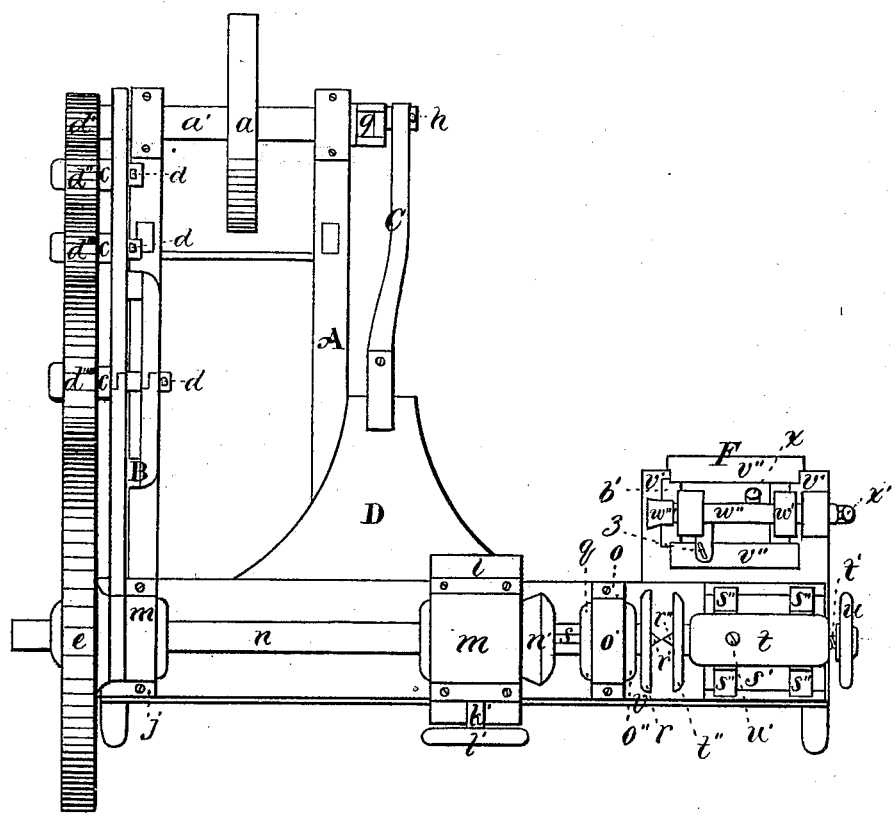
Figure 2:
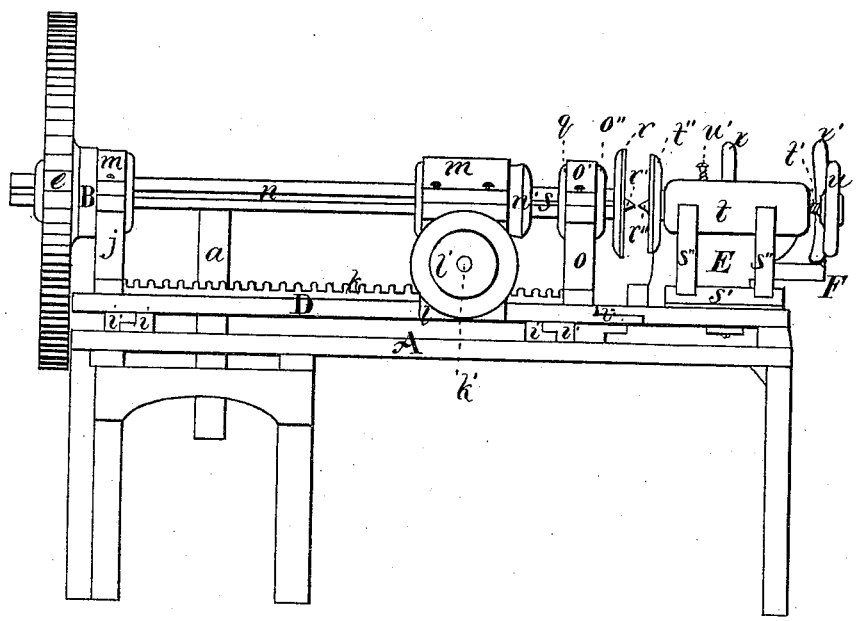
Figure 3:
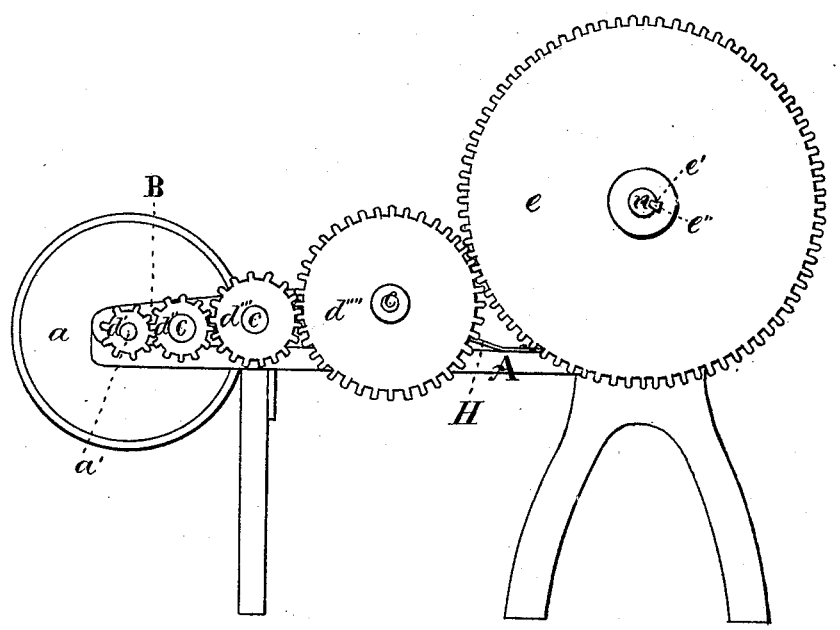
Figure 4:
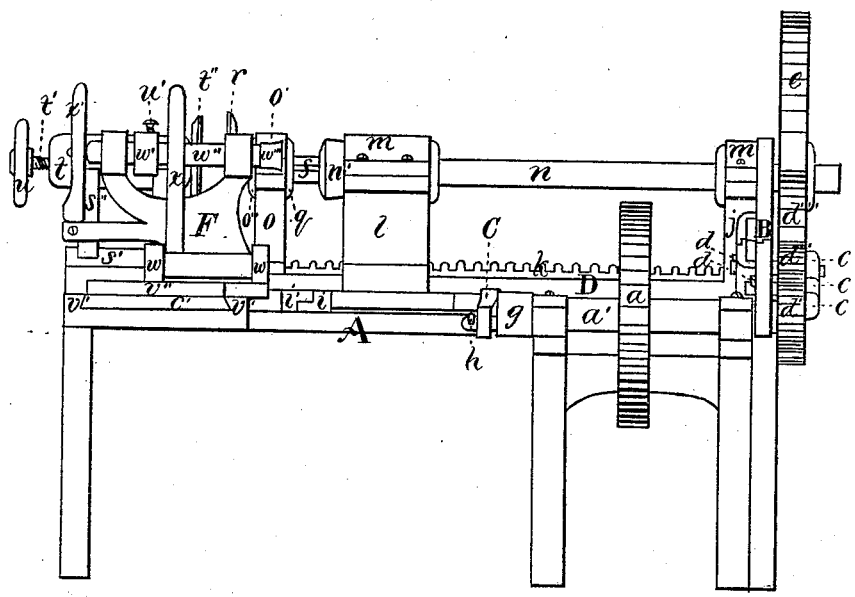
Figure 5:
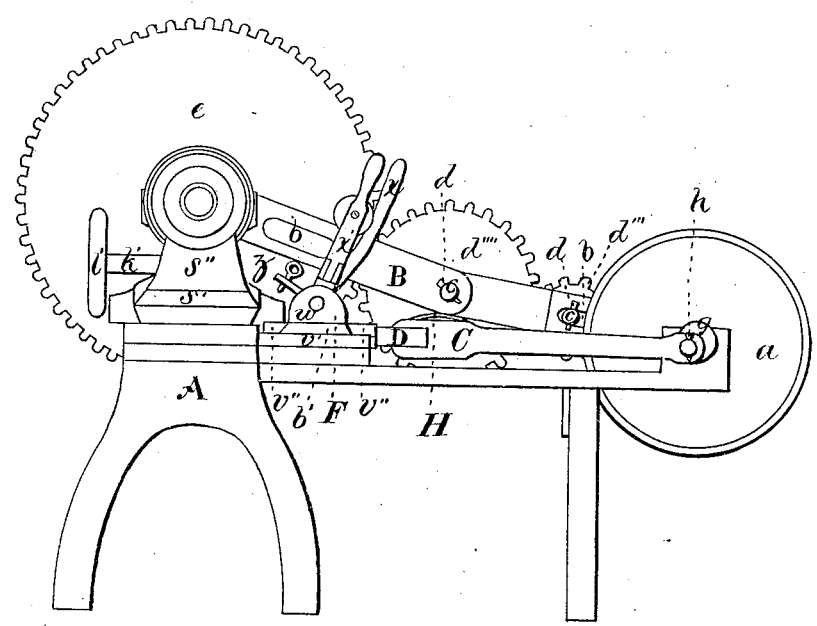
Figure 6:
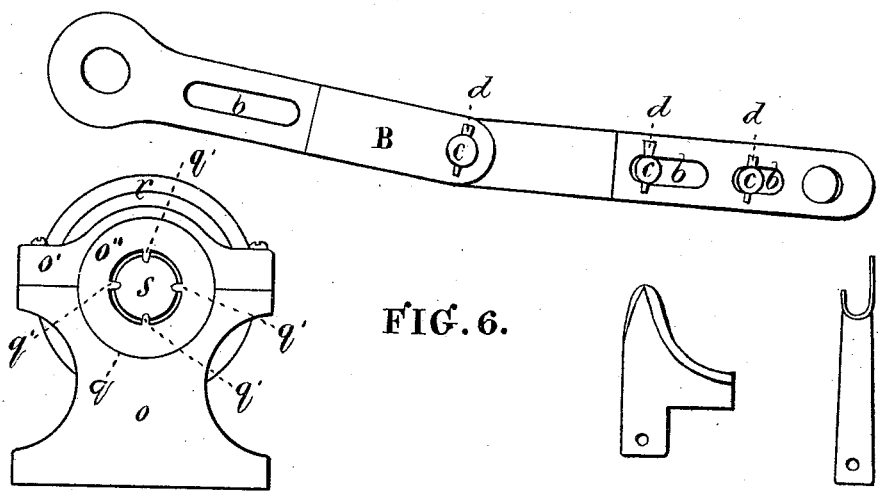
Figures 9, 10, 11:
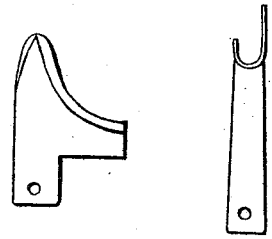
Figures 7, 8:
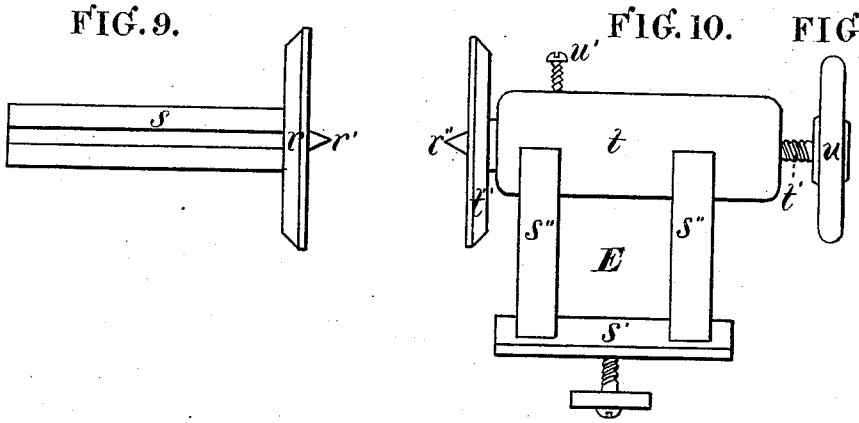

Figure 1 is a top plan of my invention; Fig. 2, a rear elevation. Fig. 3 is an end view, showing the series of gears. Fig. 4 is a front elevation. Fig. 5 is an end view. Fig. 6 is a detail of slotted elbow-arm. Fig. 7 is a detail of face-plate and spindle. Fig. 8 is a detail of device used in making picture-frames. Fig. 9 is a detail of fixed post and toothed collar. Figs. 10 and 11 show the cutting-knives used in this invention. Fig. 12 is a detail in perspective, showing the cutter-frame and face-plates. Fig. 13 is a detail plan view of the slotted socket-head. Fig. 14 is a detail, showing, in section, a means of adjusting the crank-pin in the socket-head.

My invention has for its object the production of a turning machine or lathe for cutting wood into different shapes or forms having scalloped or irregular outlines—that is, a machine which will so act upon the wood to be brought into any desired outline, that the wood will be cut and turned into different polygonal-shaped geometrical figures having their edges or borders cut or finished with recesses and curves like the segments of circles.

My invention consists of the following new combinations and skillful adaptations of mechanisms, which will be fully described and explained in the subjoined description, and explicitly illustrated in the accompanying drawings.

My invention consists, first, in combining with a lathe driving-shaft a slotted elbow-arm, said elbow-arm extending from the driving-shaft to the mandrel, a series of geared wheels, each wheel in the order having a different number of teeth, said geared wheels revolving freely on spindles which pass through the slotted elbow-arm, a geared wheel which gives revolution to the mandrel, and the mandrel and chuck.

My invention further consists in combining, with a lathe driving-shaft, a slotted socket-head, a connecting-pin, a crank-rod, and a sliding bed-piece, as will be hereinafter set out.

It also consists in combining the first and second elements of invention with a sliding bed-piece moving in guide-cleats, a fixed post, a traveling post, a rack and pinion, a chuck, a channeled mandrel, and a spline.

It also consists in combining, with the sliding bed piece, a fixed post carrying in its journal-case a toothed collar, a face-plate, and spindle, together with adjustable removable bed-piece, and operating connecting parts, as will be hereinafter set forth.

It also consists in combining a rocking cutter-frame with a sliding bed-piece and accompanying devices, as hereinafter described.

It further consists in combining a cutter-head with the sliding bed-piece and accompanying devices, as will be hereinafter described.

It also consists of a traveling post, a rack and pinion, mandrel, and chuck with a face-plate and a spindle, as will be hereinafter described.

It also consists in combining a traveling post, a rack and pinion, a sliding bed-piece, a face-plate, and spindle with an adjustable face-plate, as hereinafter set forth.

It also consists of an adjustable removable face-plate and bed-piece and a method of separating the devices from the machine, as hereinafter described.

It also consists in combining a rocking and sliding cutter-frame with its several auxiliary devices, to be hereinafter described.

It also consists in a sliding and rocking cutter-frame with auxiliary devices, as hereinafter set forth.

It also consists in the combination of a mandrel, traveling post, a sliding bed-piece, a collar, and a rotary adjustable cutter-head, as hereinafter described.

It also consists in the combination of a mandrel, a traveling post, a sliding bed-piece, a face-plate and spindle, a fixed post, and an adjustable face-plate and a rotating cutter-head, as will be hereinafter fully set out and described.

Same letters of reference relate to corresponding parts.

Referring to the drawings, A represents the table on which the machine rests. The driving-belt pulley is shown at $a$. $a'$ denotes its shaft. Extending from the end of this driving-shaft to the mandrel or shaft which revolves the lathe-chuck is the elbow-arm B, provided with the slots $b$. Through these slots pass the spindles $c$, which, in order that they may be held firmly and rigidly in any desired position, are keyed or fastened with nuts on the inside of the elbow-arm at $d$.

Arranged along the outside of the slotted elbow-arm, and revolving freely upon the spindles $c$, are a succession of geared wheels, $d'$ $d''$ $d'''$ $d''''$. Although these geared wheels mesh together and transmit revolution one to another, still no two wheels in the series have the same number of teeth. Each geared wheel has a number of teeth peculiar to itself. Further, the number of teeth in each of said geared wheels is an exact divisor of the number of teeth on the periphery of the large geared wheel $e$, which revolves the mandrel or chuck-shaft.

Again, referring to the drawings, $g$ represents a slotted socket-head on the end of the driving-shaft. Fitting into the slots in said socket-head is the connecting-pin $h$. This arrangement of slotted socket-head and connecting-pin is for the purpose of changing the eccentricity of the crank-rod C, which passes from the connecting-pin to the sliding and transversely-reciprocating bed-piece D, which may be accomplished by setting the crank-pin $h$ at any distance between the center and periphery of the socket-head by means of screws $g'$, or in any ordinary or convenient way. If desired, a sleeve, $g''$, can be used on the end of pin $h$, where arm C is attached.

On the under side of the sliding and transversely-reciprocating bed-piece D are seen the guide-cleats $i$ $i$, which fit into the guide-cleats $i'$ $i'$ on the top of the table A. These guides keep the sliding bed-piece in its true position as the bed-piece moves backward and forward when the machine is in operation.

Rising at one end of D is seen the fixed post $j$. Extending longitudinally the whole length of the sliding bed-piece is the rack $k$. $l$ is a traveling post, so arranged that it stands perfectly perpendicular upon the bed-piece, at the same time moving longitudinally by means of a pinion set in the bottom of the traveling post, which meshes into the rack. The spindle of this pinion is shown at $k'$. $l'$ is a small wheel for turning said pinion.

At the top ends of $j$ and $l$ are journal-cases $m$, through which passes the channeled or grooved mandrel or chuck-shaft $n$. $n$ also extends through the hub of the geared wheel $e$. The hub of the wheel $e$ has a key-seat, $e'$. Fitting into this key-seat, and the channel in $n$, is the spline $e''$, which permits of the revolution of $n$ and $e$, while $n$ is sliding endwise through the hub of $e$.

$n'$ is the chuck. $o$ is a fixed post, having in its head the journal-case $o'$. Inside of the journal-case is a revolving collar, $q$, having projecting rims, which fit against the side of the journal-case. On the inside of said revolving collar are the teeth $q'$, pointing toward its center.

E is a device to be used when it is desirable to apply the operation of the lathe to the production of skeleton forms or shapes, like picture-frames or looking-glass frames.

What I designated by E is composed of the following constituent parts:

$r$ is a face-plate or disk, provided on its obverse side with a center pivot, $r'$. It is further provided on the reverse side with a channeled or grooved spindle, $s$. This spindle projects through the revolving collar $q$ into the chuck $n'$. The motion of the chuck is communicated to the spindle by having the spindle fitted closely into the chuck by the ordinary methods. At the same time the teeth $q'$ fit into the channels and hold the spindle securely in its position.

The object of the channeled or grooved spindle $s$ and toothed collar $q$ is to transmit motion to the face-plate $r$.

$s'$ is a base-plate, having on its under side a projection which fits into a slot in the sliding and transversely-reciprocating bed-piece D. Rising from $s'$ are two posts, $s''$ $s''$.

$t$ is a cylinder resting upon $s''$ $s''$. Through said cylinder works the screw $t'$, which enters the reverse side of another face-plate, $t''$. On the obverse side of $t''$ is the center-pivot $r''$. At the other end of the screw is the small wheel $u$, to be used in turning and adjusting the face-plate $t''$.

$u'$ represents a set-screw which presses against $t'$ to hold it firmly and rigidly in its place when necessary.

The whole device which I characterize as E is adjustable and removable. That I can readily and easily accomplish this in addition to making $s'$ with a projection on its under side fitting into a slot in the sliding bed-piece, the sliding bed-piece is divided into two parts, as represented in the drawings, at the point $v$.

In operation, the two ends of the division are spliced together, the two scarfed edges overlapping, and being held together by screws turned in from the under side.

F represents the rocking cutter-frame. This cutter-head rests primarily upon the top of the table A, and is so arranged as to be easily pushed backward and forward in the guides $v'$. Secondarily, it has a motion lengthwise along the plane of the table top through the guides $v''$.

$w$ $w$ are bearings in which rocks the frame of the cutter-head. In the top of that frame is seen the small belt-pulley $w'$ and its shaft $w''$. Rigidly attached to said shaft $w''$ is a head, $w'''$, carrying a cutting-knife of any convenient shape to perform the functions required.

$x$ is an arm for adjusting the backward and forward motion of the cutting-head. $x'$ shows a lever-arm to be used in pushing the knife into contact with the material to be operated upon as it is held in its proper position, either between the face-plates $r$ and $t''$, or as it projects from the chuck $n'$ through the collar $q$; also, it is used in drawing the knife away from said material. On the back side of the cutter-head frame is seen the screw $z$, which is used in adjusting the frame so that the knife in the cutter-head may be adapted to the cutting of scallops of different sizes.

The base-piece running in the guides $v'\,v'$ is shown at $c'$. That running in $v''\,v''$ is represented by $b'$.

It will thus be seen from the foregoing description that the sliding and transversely-reciprocating bed-piece D, by the revolutions of the belt-pulley $a$, is moved toward and from the rocking cutter-frame F. This backward and forward motion of the sliding bed, carrying as it does the wood, first nearer to and then remoter from the cutting-head, produces the scallops or various curves upon the edge or periphery of any configuration that is being wrought out.

As before specified, the slotted socket-head $g$ and pin $h$ may be adjusted so as to produce a greater or less movement of the sliding bed-piece, as desired. Such motion controls the depth of the cuts or scallops.

The number of the cuts or scallops to be produced upon any given periphery is regulated by the arrangement of the graduated gears $d'\ d''\ d'''\ d''''$. To illustrate: If the sliding bed moves backward and forward eight times while the gear $e$ is making one revolution, then there will be eight scallops cut upon the periphery of the figure or block being formed. For instance, with the gear $d'$ set on the shaft of the belt-pulley $a$, having nine teeth, and the gear $e$ on the mandrel or chuck shaft $n$, having seventy-two teeth, the sliding bed will advance and retreat eight times while the wood in the chuck turns once. Thus an eight scallop will be formed upon the periphery of the piece of wood placed between the face-plates $r$ and $t''$ or projecting from the chuck $n'$. With the gear $d''$ placed upon the shaft $a'$, and placing $d'$ in its place, six scallops will be formed. Obviously, to accomplish this result $d''$ must have twelve teeth.

It is thus manifest that the number of scallops with any given adjustment of the machine depends upon the number of teeth on the prime gear set on the shaft $a'$, and that the number of curves, indentations, scallops, or valleys to be cut can be extensively varied.

The general operation is as follows:

*To make a picture-frame.*—The machine is designed to make or cut circular, oval, scalloped, or other shaped picture-frames from a piece of board. The board is first held at or near its center by the center pivots $r'\ r''$ on the two faces of the disks $r$ and $t''$. The set-screw $t'$ is turned up so as to hold the disk $t''$ in the desired place. The traveling post $l$ is then brought up so that the spindle $s$ enters the chuck $n'$. Revolution is thus imparted to the board to be cut. A knife of the form shown in Fig. 10 is set on the center of the end of the rotary cutter-head. The rotary cutter-head, with its attendant devices, is then adjusted in proper relations to the rotating piece of board by means of the two sets of guides $v'\ v'$ and $v''\ v''$ and the two sliding bases $c'$ and $b'$. The rotary cutter-head is then moved up toward the rotating piece of board; then, by means of the lever $x'$, the rotary cutter-head with its knife is inserted into the rotating lumber, and the desired outside periphery is given to the picture-frame. The cutter-head frame is then adjusted, by means of its sliding bases $c'$ and $b'$, so as to cut the lumber and make the opening or space within the picture-frame and to leave the frame of the desired width.

*To cut scallops on the periphery of any curved shape of lumber.*—The part $s'$ and its accompanying parts, as hereinbefore described, are removed, as well as the disk $r$, with its spindle. The lumber to be operated upon derives its rotation from the chuck $n'$, and passes through the collar $q$, which rotates with the wood. A knife of a form shown in Fig. 11 is then applied to the periphery of the rotary cutter-head.

The backward and forward motions to the sliding bed-piece are produced in the manner hereinbefore described. The velocity of the revolution of the mandrel is determined by the arrangement of the gears $d'\ d''\ d'''\ d''''$, as hereinbefore set forth.

The machine being started, the adjusting-screw $z$ is set at the desired adjustment, and the cutter-head is rocked forward by means of the lever $x$ and then held steadily.

The automatic operations of the machine produce the form and give the concave and convex curves to the lumber operated upon.

When a piece has been cut from the end of the stick of lumber the traveling post $l$ and chuck $n'$ are advanced so that the stick shall project sufficiently through the collar $q$ to enable the rotary cutter to cut off another piece or form of the same thickness as the preceding one. A graduated scale or index arranged at any convenient place on the sliding bed-piece will enable the operator accurately to determine the distance.

The spring H holds the elbow-arm at the proper elevation, and eases the arm from the weight of the gears $d'\ d''\ d'''\ d''''$.

What I claim as my invention, and desire to secure by Letters Patent, is—

1. The combination of the shaft $a'$, gears $d'\ d''\ d'''\ d''''$, gear-wheel $e$, elbow-arm B, mandrel $n$, chuck $n'$, transversely-reciprocating bed-piece D, and traveling post $l$, slotted socket-head $g$, and crank-rod C, substantially as and for the purposes herein set forth.

2. The combination, with $a'$, of the slotted socket-head $g$, crank-rod C, and sliding bed-piece D, gears $d'\ d''\ d'''\ d''''$, as described.

3. The combination, with the sliding and transversely-reciprocating bed-piece D, of the gears $d'$ $d''$ $d'''$ $d''''$, gear $e$, mandrel $n$, chuck $n'$, and traveling post $l$, slotted socket-head $g$, and crank-rod C, as herein set forth.

4. The combination of the sliding and transversely-reciprocating bed-piece D, traveling post $l$, rack $k$, and pinion, and the mandrel $n$, substantially as and for the purposes herein set forth.

5. The combination of the sliding and transversely-reciprocating bed-piece D, with its chuck $n'$ and mandrel $n$, with the fixed post $o$ and collar $q$, spindle $s$, and face-plate $r$, as and for the purposes described.

6. The combination of the traveling post $l$, rack $k$, and pinion, mandrel $n$, and chuck $n'$, with the fixed post $o$, face-plate $r$, and spindle $s$, substantially as herein set forth.

7. The combination of the mandrel $n$, chuck $n'$, traveling post $l$, rack $k$, and pinion, sliding and transversely-reciprocating bed-piece D, face-plate $r$, and spindle $s$, with the adjustable face-plate $t''$, substantially as and for the purposes herein set forth.

8. The combination of the adjustable and removable device E, having face-plate $t''$, cylinder $t$, wheel $u$, set-screws $t'$ and $u'$, and base-piece $s'$, with the transversely reciprocating sliding bed-piece D, collar $q$, face-plate $r$, spindle $s$, chuck $n'$, and rocking sliding cutter-head frame, as and for the purposes herein described.

9. The rocking sliding cutter-head frame, having the levers $x$ $x'$, bases $c'$ and $b'$, guides $v'$ $v'$ $v''$ $v''$, and adjusting-screw $z$, as and for the purposes herein described.

10. The rocking cutter-frame, provided with set-screw $z$, lever $x'$, sliding base-piece $b'$, and guides $v''$ $v''$, as and for the uses herein set out.

11. The combination of the mandrel $n$, traveling post $l$, sliding and transversely-reciprocating bed-piece D, collar $q$, and rotating cutter-head, adjustable substantially as herein described.

12. The combination of the mandrel $n$, traveling post $l$, sliding and transversely-reciprocating bed-piece D, face-plate $r$, spindle $s$, fixed post $o$, adjustable face-plate $t''$, and rotary cutting-head, operating as and for the purposes herein described.

In testimony that I claim the foregoing as my own I affix my signature in presence of two witnesses.

FREEMAN HANSON.

Witnesses:
  HERBERT G. BRIGGS,
  CHARLES E. CLIFFORD.